Aug. 13, 1929.  T. PETERSEN  1,724,410
DIESTOCK
Original Filed July 23, 1926
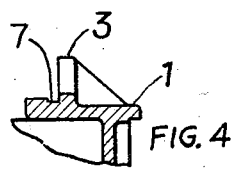
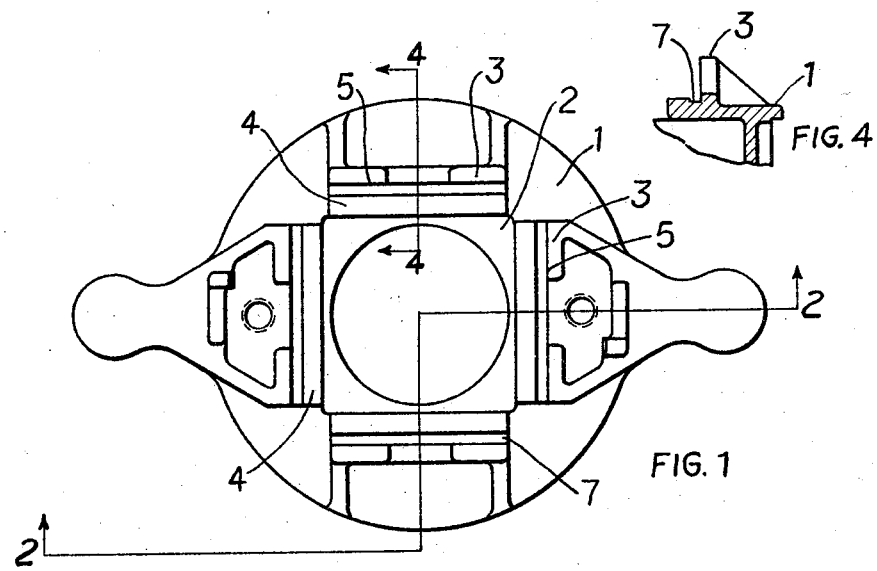
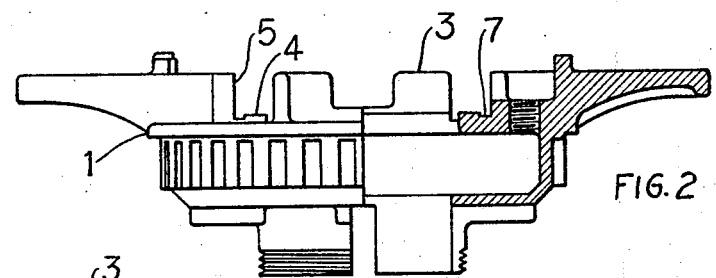
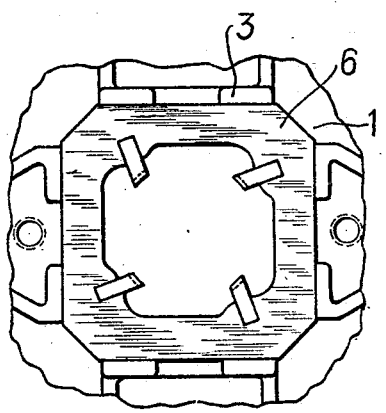

Patented Aug. 13, 1929.

1,724,410

UNITED STATES PATENT OFFICE.

THORVALD PETERSEN, OF ERIE, PENNSYLVANIA, ASSIGNOR TO REED MANUFACTURING COMPANY, OF ERIE, PENNSYLVANIA, A CORPORATION OF PENNSYLVANIA.

DIESTOCK.

Application filed July 23, 1926, Serial No. 124,328. Renewed January 3, 1929.

This invention is designed to improve die stocks, particularly die stocks designed to receive solid dies. With such stocks it is desirable to have the dies seated in a socket in which the die makes a close fit so that the die may be held rigidly with the stock and at the same time so arranged that the dies may be readily changed as desired. To accomplish this purpose it is desirable that the seating surfaces of the die be machined. The present invention provides a stock in which this may be accomplished in a very simple and efficient manner. Features and details of the invention will appear from the specification and claims.

The invention is illustrated in the accompanying drawings as follows:—

Fig. 1 shows a plan view of the stock with the die removed.

Fig. 2 a section on the line 2—2 in Fig. 1.

Fig. 3 a plan view of the stock with the die in place.

Fig. 4 a section on the line 4—4 in Fig. 1.

1 marks the stock head, and 2 the die-receiving socket. This has the surrounding guides 3 and the bottom seating surfaces 4. The guides 3 are provided with the inner machined surfaces 5 which receive the dies. The guides 3 do not extend to the corners of the socket leaving open spaces. In the machining of the die milling cutters in pairs may be run through the head cutting simultaneously the surfaces 5 on the opposing guides and the companion seats 4. The head is then swung 90° and the remaining pair of guides are surfaced with their companion seats. Thus the machining can be very accurately done, the distances between the guide surfaces being controlled by the position of the milling cutters and the seating surfaces at the bottom may be formed simultaneously with the machining of the guides. In order that the machining may be more readily accomplished a groove 7 is cast between the guides 3 and seats 4, thus making it unnecessary to machine the extreme corners between the guides and surfaces.

What I claim as new is:—

1. A die stock having a die socket having surrounding guides on four sides of the socket adapted to receive by direct engagement the sides of a die, said guides having openings therethrough and die seating surfaces in the bottom of the socket confined to spaces in alinement with the openings through the guides whereby an unobstructed passage is provided through the openings in the guides and along the die seating surfaces for machining said surfaces.

2. A die stock having a die socket having surrounding guides on four sides of the socket adapted to receive by direct engagement the sides of a die, said guides having openings therethrough at the corners whereby an unobstructed passage is provided for machining the socket faces of the guides.

3. A die stock having a die socket having surrounding guides on four sides of the socket adapted to receive by direct engagement the sides of a die, said guides having openings at the corners of the sockets, the die having seating surfaces in the bottom of the socket confined to spaces in alinement with the openings whereby an unobstructed passage is provided for machining the seating surfaces and the socket faces of the guides.

In testimony whereof I have hereunto set my hand.

THORVALD PETERSEN.